UNITED STATES PATENT OFFICE.

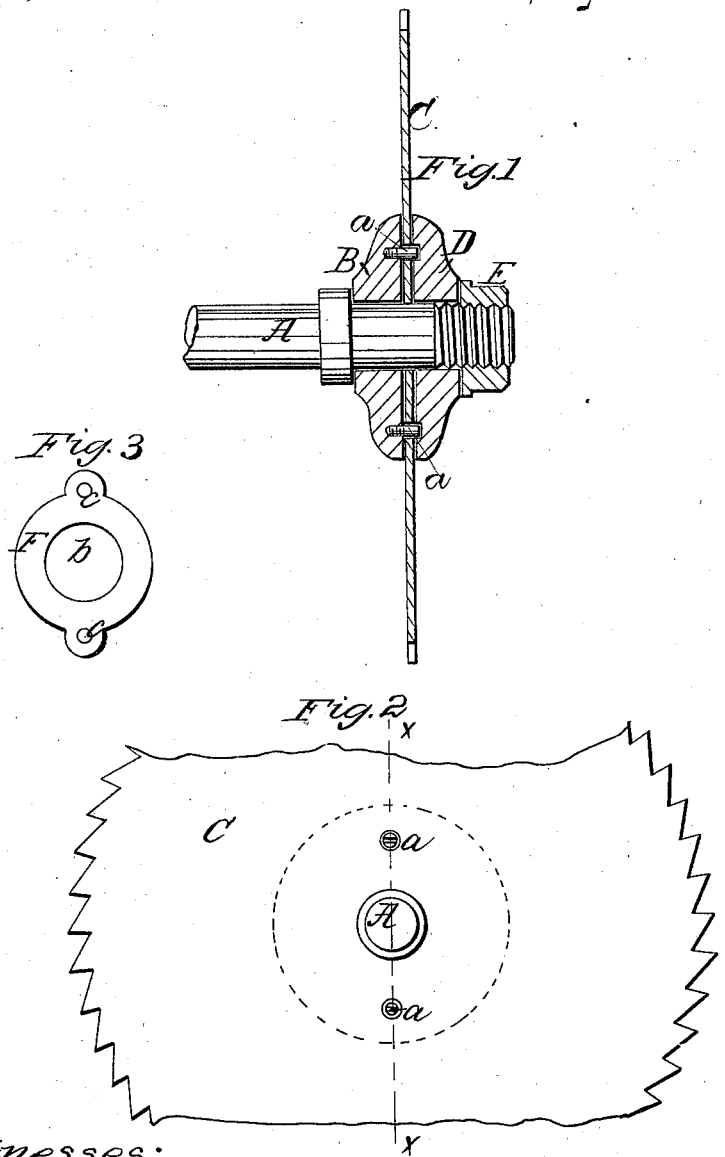

WILLIAM McDONALD, OF CALAIS, MAINE.

Letters Patent No. 81,661, dated September 1, 1868.

---

IMPROVEMENT IN HANGING CIRCULAR SAWS.

---

The Schedule referred to in these Letters Patent and making part of the same.

---

TO ALL WHOM IT MAY CONCERN:

Be it known that I, WILLIAM McDONALD, of Calais, in the county of Washington, and State of Maine, have invented a new and useful Improvement in Hanging or Securing Circular Saws to their Shafts; and I do hereby declare that the following is a full, clear, and exact description thereof, which will enable others skilled in the art to make and use the same, reference being had to the accompanying drawings, forming part of this specification, in which—

Figure 1 is a longitudinal section of a saw-shaft or arbor, with a saw secured upon it according to my invention, the saw being also in section, as indicated by the line $x\ x$, fig. 2.

Figure 2 is a detached side view of a portion of the saw.

Figure 3 is a detached side view of a gauge or templet, used in carrying out my improvement.

Similar letters of reference indicate corresponding parts.

This invention relates to an improvement in hanging circular saws upon their arbors, and it consists in the combination of two screw-pins with the saw, a fixed and a movable collar, whereby the saw is held firmly upon the arbor, as will be hereinafter more fully described.

A represents a saw-shaft or arbor, in which there is a fixed or permanent collar, B, the face-side of which is turned off true, so as to be in a plane at right angles with the axis of the saw-shaft or arbor.

C is a circular saw, which is provided with a central hole, to admit of the shaft or arbor passing through it.

D is a loose collar, which is fitted on the shaft or arbor at the outer side of the saw, and E is a nut, which is fitted on a screw-thread cut on the shaft. By screwing up this nut, the saw C may be clamped between the two collars B D.

These parts are old, and constitute a well-known means for securing circular saws on their shafts or arbors.

My improvement is as follows:

Into the face-side of the permanent or fixed collar B, I insert two pins or screws $a\ a$, which are at equal distances from the saw-shaft or arbor, at opposite sides thereof, and in a line which passes transversely through the centre of the saw-shaft or arbor.

Through the saw C, there are made two holes, at corresponding distances from its centre, and of such a diameter as to admit of the pins or screws $a\ a$ passing through them, corresponding holes being made in the face of the loose collar D, to receive the portions of the pins or screws which project through the saw, as shown clearly in fig. 1.

In order to admit of the pins or screws $a\ a$, and the holes in the saw as well as those in the loose collar D, corresponding in position in every instance, I employ a gauge or templet, F, shown clearly in fig. 3.

This gauge or templet, I prefer making of a tempered or hardened-steel plate, having a central hole, $b$, corresponding in diameter with the shaft or arbor-hole in the centre of the saw, and having two smaller holes $c, c$, made in it at opposite sides of the hole $b$, at distances corresponding with the distance of the pins or screws $a\ a$ from the shaft or arbor A.

By means of this gauge or templet, the holes in the saw may be accurately drilled, and all saws of a given size or diameter, or intended for a certain-sized shaft or arbor, fitted properly on the latter, one saw being changed for another without any trouble or difficulty whatever, different gauges or templets being employed for different-sized saws, or different-sized arbors.

A sawyer may furnish a saw-maker with a gauge or templet, in order to insure the holes being made correctly in the saw.

By means of this improvement, a saw will be prevented from turning on its arbor and unscrewing the nut, and the latter does not require to be screwed up as tight as usual, and when the face of the fixed or permanent collar B requires to be turned off.

Having thus described my invention, I claim as new, and desire to secure by Letters Patent—

The fixed collar B, provided with the series of pins $a$, adapted to pass through the saw C and into the loose collar D, said saw and collar D being clamped firmly to the fixed collar by the screw-nut E, as herein shown and described.

WM. McDONALD.

Witnesses:
   JOHN BARKER,
   JOHN MARTIN.